United States Patent
German et al.

(10) Patent No.: US 11,045,903 B2
(45) Date of Patent: Jun. 29, 2021

(54) SHIELDING GAS WELD CONE AND METHOD

(71) Applicant: COVIDIEN LP, Mansfield, MA (US)

(72) Inventors: Curtis S. German, Longmont, CO (US); James J. Crawford, Lyons, CO (US); Michael T. Pike, Erie, CO (US)

(73) Assignee: COVIDIEN LP, Mansfield, MA (US)

( * ) Notice: Subject to any disclaimer, the term of this patent is extended or adjusted under 35 U.S.C. 154(b) by 291 days.

(21) Appl. No.: 16/200,754

(22) Filed: Nov. 27, 2018

(65) Prior Publication Data

US 2019/0168338 A1    Jun. 6, 2019

Related U.S. Application Data

(60) Provisional application No. 62/594,701, filed on Dec. 5, 2017.

(51) Int. Cl.
   *B23K 26/12*    (2014.01)
   *B23K 26/14*    (2014.01)
   *B23K 26/22*    (2006.01)

(52) U.S. Cl.
   CPC .......... *B23K 26/123* (2013.01); *B23K 26/147* (2013.01); *B23K 26/1423* (2013.01); *B23K 26/22* (2013.01)

(58) Field of Classification Search
   CPC .... B23K 26/123; B23K 26/22; B23K 26/147; B23K 26/1482; B23K 26/1476; B23K 26/1423
   See application file for complete search history.

(56) References Cited

U.S. PATENT DOCUMENTS

| | | | | |
|---|---|---|---|---|
| 4,167,662 A | * | 9/1979 | Steen | B23K 9/0675 219/121.64 |
| 5,756,962 A | * | 5/1998 | James | B23K 26/0665 219/121.75 |
| 6,034,343 A | * | 3/2000 | Hashimoto | B23K 26/348 219/74 |
| 2012/0037604 A1 | * | 2/2012 | Shikata | G02B 7/008 219/121.67 |

FOREIGN PATENT DOCUMENTS

DE    19701516 C1  *  2/1998  ........... B23K 26/702

OTHER PUBLICATIONS

Machine translation of DE-19701516-C1, Nov. 2020.*

* cited by examiner

*Primary Examiner* — Geoffrey S Evans
(74) *Attorney, Agent, or Firm* — Carter, DeLuca & Farrell LLP

(57) ABSTRACT

A device for distributing gas near a weld location includes a cap, a funnel, an inlet, and an aperture. The cap includes a sidewall and an annular lip, and defines a reservoir between the sidewall and the annular lip. The annular lip includes a proximal-most edge. The cap defines an opening, and defines a longitudinal axis. The funnel is disposed adjacent a distal end of the cap. The inlet is disposed in mechanical cooperation with the cap. The aperture is disposed through the sidewall of the cap and is in fluid communication with the inlet. The aperture is disposed distally of the proximal-most edge of the annular lip. Gas is configured to flow through the inlet, through the aperture and into the reservoir. The reservoir is configured to allow the gas to uniformly overflow the proximal-most edge of the annular lip and flow distally through the opening defined by the cap.

6 Claims, 5 Drawing Sheets

SHIELDING GAS WELD CONE AND METHOD

CROSS REFERENCE TO RELATED APPLICATION

The present application claims the benefit of and priority to U.S. Provisional Application Ser. No. 62/594,701, filed on Dec. 5, 2017 the entire contents of which are incorporated herein by reference.

BACKGROUND

Technical Field

The present disclosure relates to a device for use during a welding process, and, more particularly, to a cone for use during welding using shielding gas and a related method.

Background of Related Art

When manufacturing and assembling surgical instruments, it is often desired to weld two or more components together. Further, shielding gas (e.g., argon gas) may be used during the welding process for various instruments, including surgical instruments. Shielding gases, such as argon, are inert gases that are typically used in a laser welding process to help prevent oxidization of the weld and to shield a laser arc from outside contaminants and gases, which may react with the weld causing aesthetic disparities, excessive slag, and weld inconsistency. Directing the flow of shielding gas to the location of the weld is often challenging because shielding gas is heavier than air, and thus gathers in flow streams instead of dispersing with the air for a more uniform application.

The ability to uniformly pour shielding gas over the location of the weld is desirable to create a shield from outside contaminates.

SUMMARY

The present disclosure relates to a device configured for distributing gas near a weld location. The device including a cap, a funnel, an inlet, and an aperture. The cap includes a sidewall and an annular lip, and defines a reservoir between the sidewall and the annular lip. The annular lip includes a proximal-most edge. The cap defines an opening, and has a longitudinal axis extending through a radial center of the opening from a proximal end of the opening to a distal end of the opening. The funnel is disposed adjacent a distal end of the cap. The inlet is disposed in mechanical cooperation with the cap. The aperture is disposed through the sidewall of the cap and is in fluid communication with the inlet. The aperture is disposed distally of the proximal-most edge of the annular lip. Gas is configured to flow through the inlet, through the aperture and into the reservoir. The reservoir is configured to allow the gas to uniformly overflow the proximal-most edge of the annular lip and flow distally through the opening defined by the cap.

In aspects of the present disclosure, the funnel is selectively engageable with the cap.

In other aspects, the funnel is configured to selectively engage the cap with a plurality of magnets.

In still other aspects, the device includes a first plurality of magnets disposed on a distal end of the cap, and a second plurality of magnets disposed on a proximal end of the funnel.

In yet other aspects, a distal end of the cap is disposed at a non-perpendicular angle with respect to the longitudinal axis, and a proximal end of the funnel is disposed at a non-perpendicular angle with respect to the longitudinal axis. In disclosed aspects, the device includes a first plurality of magnets disposed on the distal end of the cap, and a second plurality of magnets disposed on the proximal end of the funnel.

The present disclosure also related to a method of manufacturing an instrument. The method includes positioning a weld cone adjacent a weld site, the weld cone including a sidewall and an annular lip, and defining a reservoir between the sidewall and the annular lip, ensuring a proximal-most edge of the annular lip is level, engaging a supply of shielding gas with the weld cone, and filling the reservoir with shielding gas such that the shielding gas flows over the proximal-most edge of the annular lip, which thereby creates a uniform curtain of shielding gas adjacent the weld site.

In aspects of the present disclosure, the method also includes inserting a portion of a welding device within an opening of the weld cone, and also includes using the welding device to emit a laser arc toward the weld site, such that the laser arc is disposed within the curtain of shielding gas.

In other aspects, the method includes selectively engaging and disengaging a funnel of the weld cone with a cap of the weld cone.

BRIEF DESCRIPTION OF THE DRAWINGS

Various aspects of the present disclosure are described herein with reference to the drawings wherein like reference numerals identify similar or identical elements.

DETAILED DESCRIPTION

Figure 1:
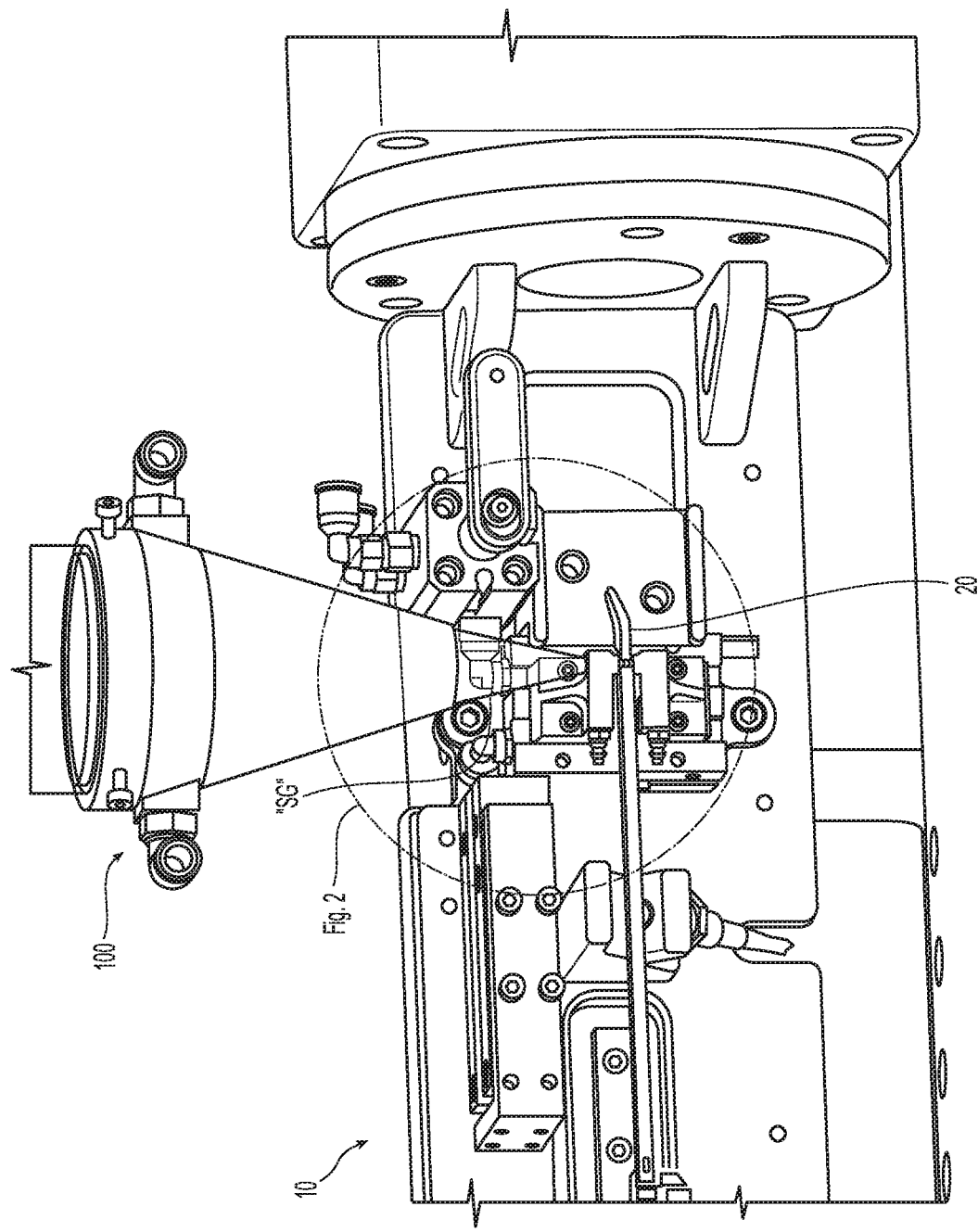
FIG. 1 is a perspective view of an shielding gas weld cone in accordance with the present disclosure illustrated adjacent a surgical instrument in a manufacturing environment.

Embodiments of the presently disclosed shielding gas weld cone are described in detail with reference to the drawings, in which like reference numerals designate identical or corresponding elements in each of the several views.

With initial reference to FIG. 1, an embodiment of an shielding gas weld cone in accordance with the present disclosure is shown generally identified by reference character 100. Although shielding gas weld cone 100 is shown configured for use in connection with the assembly and manufacture of surgical instruments, the present disclosure is equally applicable for utilizing the shielding gas weld cone 100 for the assembly and/or manufacture of other devices where the use of welding may be desired.

Figure 2:
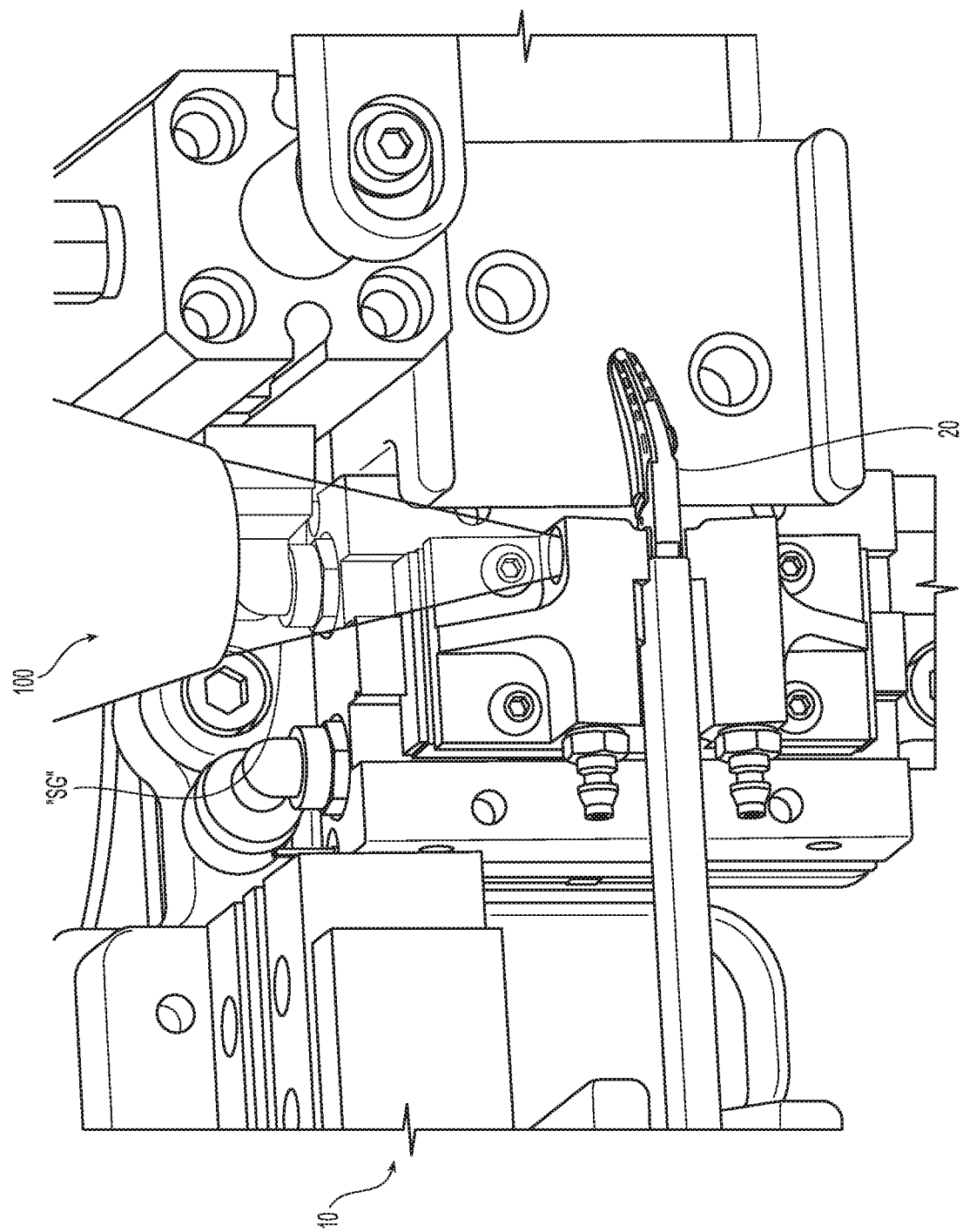
FIG. 2 is a detailed view of the area indicated in FIG. 1.

With initial reference to FIGS. 1 and 2, shielding gas weld cone 100 is configured for use in a manufacturing or welding environment 10. Such an environment 10 is often suitable for the manufacture and assembly of various devices (e.g., a surgical instrument 20, or portions thereof). During many assembly and manufacturing methods, using shielding gas (e.g., argon) during the welding process can help prevent oxidization of the weld and shield a laser arc from outside contaminants and gases, thus resulting in a more aesthetic weld having reduced slag and greater weld consistency, for example. However, directing the flow of shielding gas to the location of the weld is often challenging because shielding gas is heavier than air, and thus gathers in flow streams instead of dispersing with the air for a more uniform application.

Shielding gas weld cone 100 of the present disclosure enables a uniform shield or curtain of shielding gas "SG" to be directed toward or poured over the location of the weld, as shown in FIGS. 1 and 2.

Figure 3:
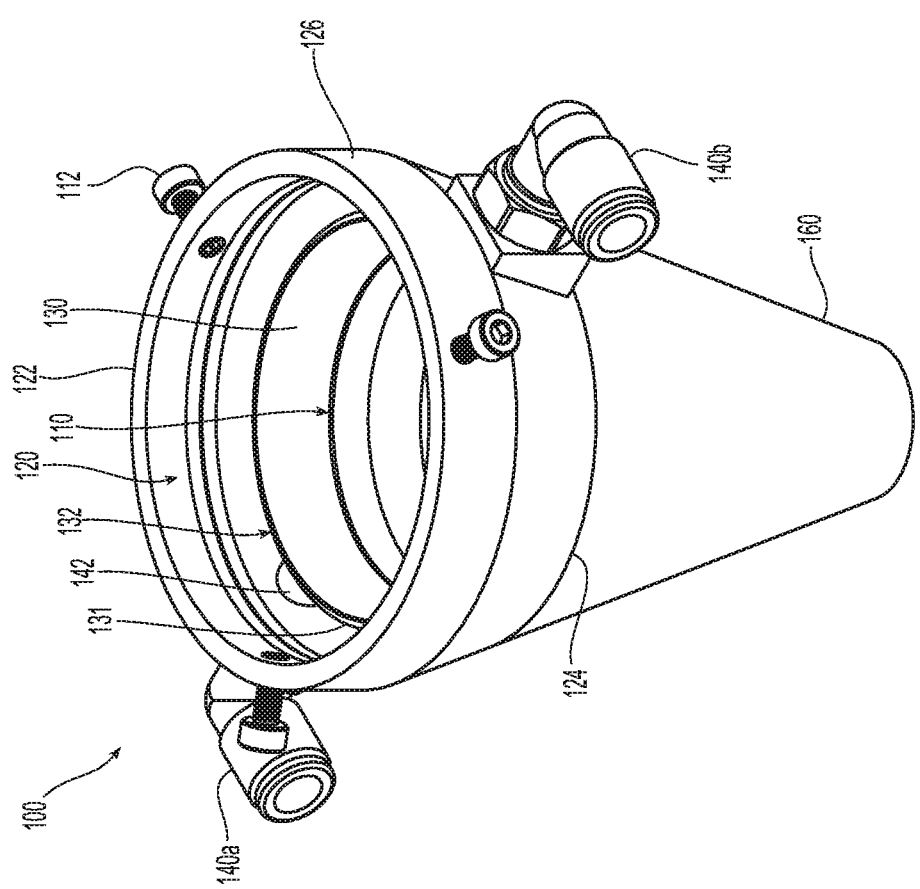
FIG. 3 is a perspective view of the shielding gas weld cone of FIGS. 1 and 2.
Figure 4:
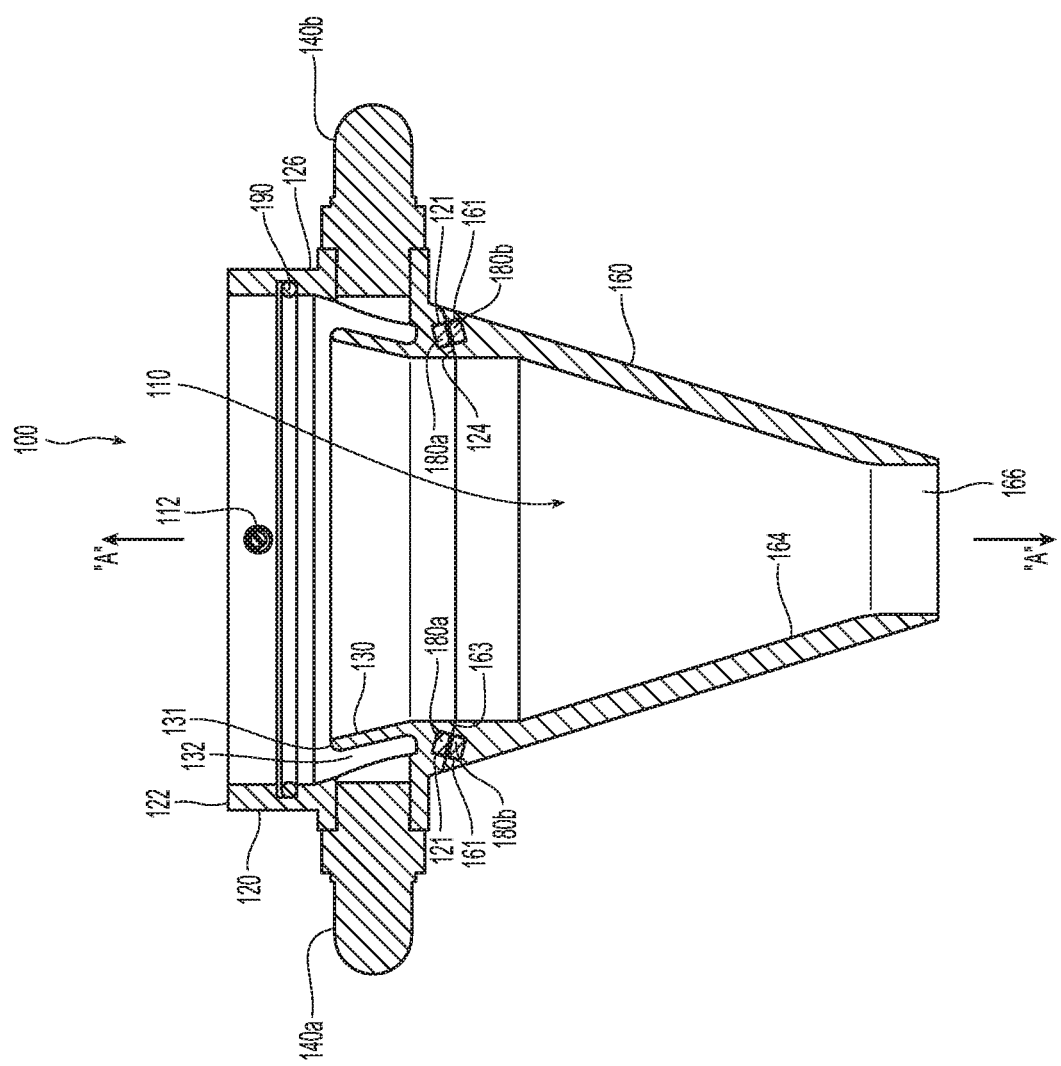
FIG. 4 is a cross-sectional view of the shielding gas weld cone of FIGS. 1-3.
Figure 5:
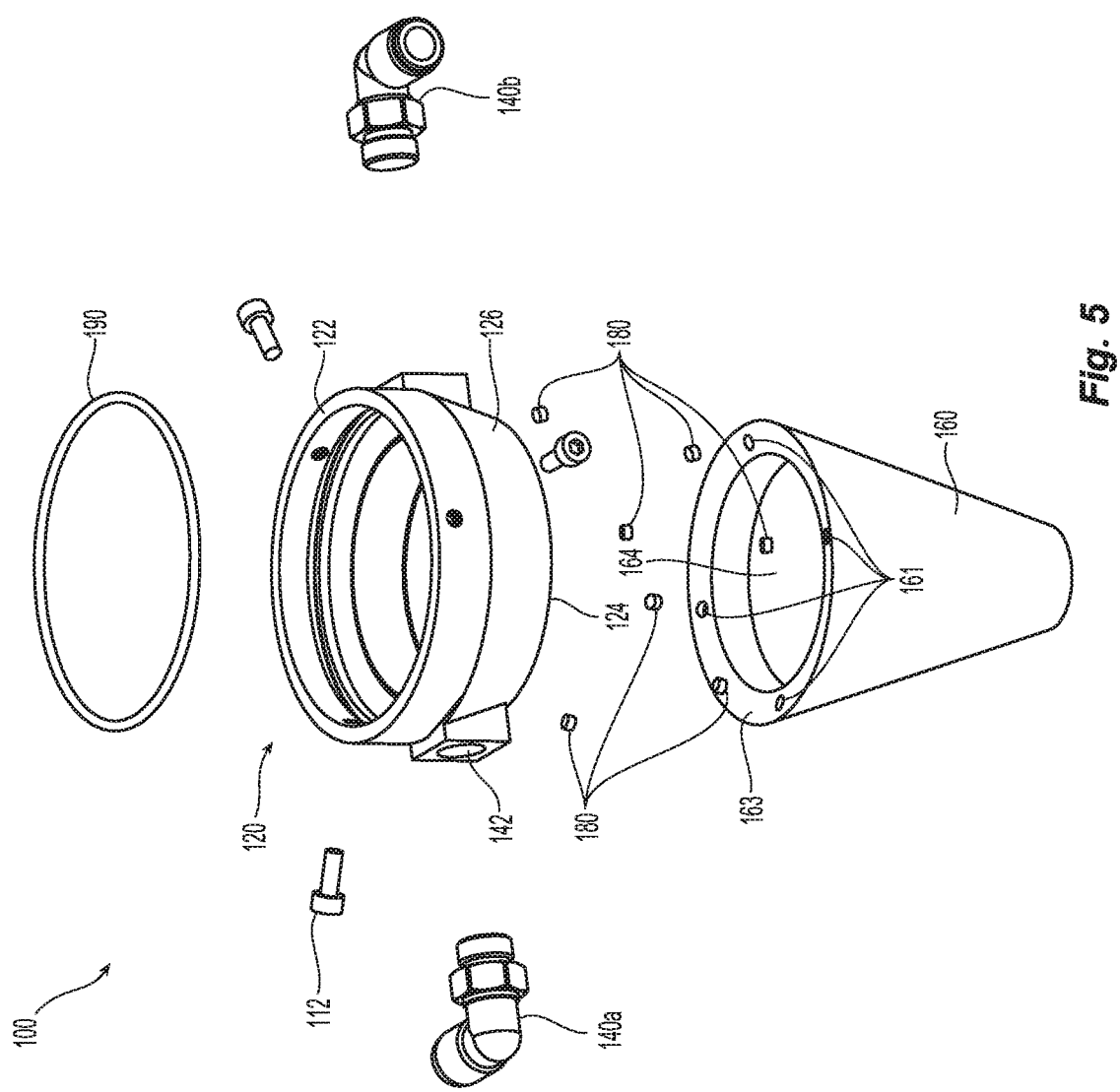
FIG. 5 is an assembly view of the shielding gas weld cone of FIGS. 1-4.

With reference to FIGS. 3-5, shielding gas weld cone 100 includes a ring-like cap 120, a pair of inlets 140*a*, 140*b*, and a frusto-conical portion or funnel 160. In the illustrated embodiment, inlets 140*a*, 140*b* are each in fluid communication with a separate aperture 142 extending through a sidewall 126 of cap 120 and disposed on opposite sides of cap 120. Funnel 160 is engaged with or depends from cap 120. More or fewer inlets 140*a*, 140*b* and apertures 142 may be provided. Shielding gas weld cone 100 defines a longitudinal axis "A-A," as shown in FIG. 4.

More particularly, cap 120 includes a proximal end 122, a distal end 124, sidewall 126, and a lip 130. As shown in FIG. 4, an annular channel or reservoir 132 is defined between lip 130 and sidewall 128 of cap 120. Additionally, apertures 142 extend through sidewall 126 of cap 120 and are in fluid communication with reservoir 132. A proximal-most edge 131 of lip 130 is positioned farther proximally than a proximal-most portion of apertures 142.

Funnel 160 extends distally from cap 120 and is configured to direct shielding gas "SG" toward the weld site. Funnel 160 may be connected to cap 120, integrally formed with cap 120, coupled to cap 120, affixed to cap 120, or selectively attachable to and removable from cap 120, for example. In the illustrated embodiment, funnel 160 selectively engages cap 120 with a plurality of magnets 180 (see FIG. 4). In particular, a first set of magnets 180*a* is disposed at least partially within cap recesses 121 at distal end 124 of cap. Additionally, a second set of magnets 180*b* is disposed at least partially within funnel recesses 161 at a proximal end 163 of funnel 160.

The polarity of magnets 180 is configured such that first set of magnets 180*a* and second set of magnets 180*b* are attracted to each other. It is envisioned that the polarity of the magnets in first set of magnets 180*a* and the polarity of the magnets in second set of magnets 180*b* alternate, such that funnel 160 and cap 120 can only engage one another at predefined radial orientations (e.g., only two radial orientations when first set of magnets 180*a* includes four magnets, and when second set of magnets 180*b* includes four magnets, as shown in FIG. 5).

With particular reference to FIG. 4, distal end 124 of cap 120 is tapered or disposed at a non-perpendicular angle with respect longitudinal axis "A-A." Additionally, proximal end 163 of funnel 160 is tapered or disposed at a non-perpendicular angle with respect longitudinal axis "A-A." The tapered portions of cap 120 and funnel 160 help ensure and maintain proper positioning therebetween during assembly and during use, for instance. That is, the tapered portions help prevent funnel 160 from sliding laterally (i.e., perpendicular to the longitudinal axis "A-A") relative to cap 120, for example.

Referring back to FIGS. 1 and 2, in use, shielding gas weld cone 100 is positioned adjacent a desired weld location such that the curtain of shielding gas "SG" will be directed toward the desired weld location via funnel 160. Additionally, shielding gas weld cone 100 is positioned such that proximal-most edge 131 of lip 130 of cap 120 is level (with respect to ground). That is, shielding gas weld cone 100 is positioned such that longitudinal axis "A-A" is perpendicular to the ground. It is envisioned that shielding gas weld cone 100 includes a built-in level (e.g., a bubble level) to facilitate such a level positioning.

When shielding gas weld cone 100 is properly positioned (or prior thereto), a portion of a welding device (not shown) is inserted through an opening 110 defined within and extending through shielding gas weld cone 100. A plurality of set screws (or similar) 112 extending through cap 120 is usable to temporarily secure shielding gas weld cone 100 to the welding device. Additionally, an O-ring 190 (FIGS. 4 and 5) may be included to produce a seal between shielding gas weld cone 100 and the welding device.

After the welding device is positioned with respect to shielding gas weld cone 100, a supply of shielding gas "SG" is engaged with inlets 140*a*, 140*b*. The shielding gas "SG" gas then flows through inlets 140*a*, 140*b*, through apertures 142, and accumulates within reservoir 132. Gravity keeps shielding gas "SG" within reservoir 132 until the amount of shielding gas "SG" exceeds the volume of reservoir 132 causing the shielding gas "SG" to overflow or flow over proximal-most edge 131 of lip 130. Since shielding gas weld cone 100 is level, the shielding gas "SG" overflows the entire, annular proximal-most edge 131 of lip 130 at the same time or essentially the same time. Thus, reservoir 132 of cap 120 is configured to allow the shielding gas "SG" to overflow uniformly over proximal-most edge 131 of lip 130. This uniform overflow or spilling of the shielding gas "SG" results in a curtain-like flow of the shielding gas "SG" along an inner wall 164 of funnel 160. The shielding gas "SG" continues to flow out of a distal aperture 166 of funnel 160, toward and radially surrounding the weld area, which creates curtain of shielding gas "SG" (FIGS. 1 and 2) thereby shielding the weld area from contaminates.

As noted above, funnel 160 is shown engaging cap 120 with plurality of magnets 180, thereby creating a selective connection therebetween. The selective connection may be helpful when positioning shielding gas weld cone 100 is a tight location, if a user wants to reposition funnel 160, replace a broken funnel 160, or use a different size funnel 160, for example. Additionally, the connection between cap 120 and funnel 160 is designed such that funnel 160 is able to break away or separate from cap 120, thereby reducing the chances that cap 120 or funnel 160 becomes damaged during use, reducing the odds that cap 120 becomes dislodged from the welding device during use, and reducing the likelihood that cap 120 is moved out of its level position during use, for example.

Further, the present disclosure relates to methods of manufacturing (e.g., surgical instruments 20) utilizing the disclosed shielding gas weld cone 100. Disclosed methods include positioning shielding gas weld cone 100 adjacent a weld site such that proximal-most edge 131 of lip 130 of cap 120 is level, engaging a supply of shielding gas "SG" with shielding gas weld cone 100, inserting a portion of a welding device within opening 110 of shielding gas weld cone 100, filling reservoir 132 with shielding gas "AG," and overflowing reservoir 132 with shielding gas "SG" thereby creating a uniform curtain of shielding gas "SG" near the weld site. Disclosed methods also include engaging and/or disengaging funnel 160 with cap 120.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A device configured for distributing gas near a weld location, the device comprising:
    a cap including a sidewall and an annular lip, a reservoir defined between the sidewall and the annular lip, the annular lip including a proximal-most edge, the cap defining an opening, having a longitudinal axis extending through a radial center of the opening from a proximal end of the opening to a distal end of the opening;
    a funnel disposed adjacent a distal end of the cap;
    an inlet disposed in mechanical cooperation with the cap; and
    an aperture disposed through the sidewall of the cap and in fluid communication with the inlet, the aperture disposed distally of the proximal-most edge of the annular lip;
    wherein gas is configured to flow through the inlet, through the aperture and into the reservoir, and wherein the reservoir is configured to allow the gas to uniformly overflow the proximal-most edge of the annular lip and flow distally through the opening defined by the cap, and
    wherein a distal end of the cap is disposed at a non-perpendicular angle with respect to the longitudinal axis.

2. The device according to claim 1, wherein the funnel is selectively engageable with the cap.

3. The device according to claim 1, wherein the funnel is configured to selectively engage the cap with a plurality of magnets.

4. The device according to claim 1, further comprising a first plurality of magnets disposed on a distal end of the cap, and a second plurality of magnets disposed on a proximal end of the funnel.

5. The device according to claim 1, wherein a proximal end of the funnel is disposed at a non-perpendicular angle with respect to the longitudinal axis.

6. The device according to claim 5, further comprising a first plurality of magnets disposed on the distal end of the cap, and a second plurality of magnets disposed on the proximal end of the funnel.

* * * * *